March 7, 1933.  E. C. OTIS  1,900,597
ROOFING
Original Filed April 28, 1926
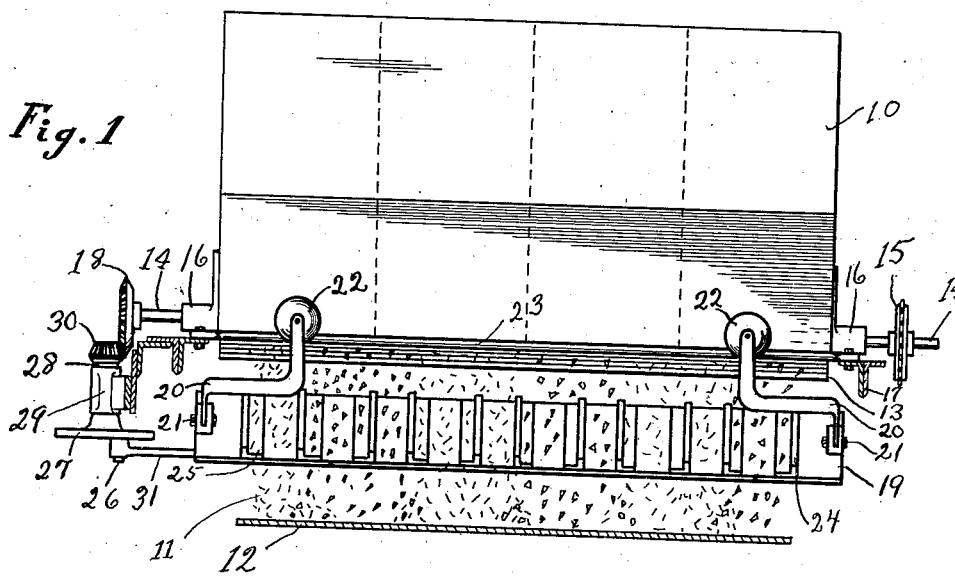
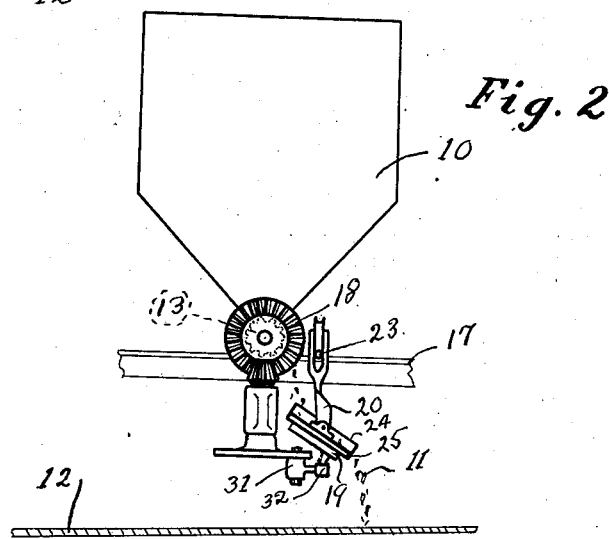
Edward C. Otis
Inventor
Albert F. Robinson
By  Attorney Patented Mar. 7, 1933

1,900,597

UNITED STATES PATENT OFFICE

EDWARD C. OTIS, OF CHICAGO, ILLINOIS, ASSIGNOR, BY MESNE ASSIGNMENTS, TO CERTAIN-TEED PRODUCTS CORPORATION, A CORPORATION OF MARYLAND

ROOFING

Application filed April 28, 1926, Serial No. 105,132. Renewed January 21, 1932.

This invention relates to apparatus for producing vari-colored roofing, which is formed by applying to the usual adhesive base, mineral particles of different colors and in nonuniform mixtures.

The object of the invention is to provide roofing apparatus for making a roofing material which when laid on a roof, will exhibit mottled or vari-colored merging and blending patches without defined or readily distinguished areas of color.

For this purpose the invention propose an apparatus for preliminarily intermingling selected ingredients of different colors and controlling their intermingling and applying the same in the conventional manner to a sheet of the usual roofing material.

The invention may be readily understood by reference to one illustrative embodiment, shown in the accompanying drawing, in which:

Fig. 1 is a side view of the delivering hopper and the reciprocating member for supplying the vari-colored surfacing materials to the traveling roofing sheet, and Fig. 2 is an end elevation of the apparatus shown in Fig. 1.

In the drawing the usual type of divided hopper 10 is employed from which the granular surfacing material such as crushed slate flows in a continuous stream 11 extending entirely across a sheet of foundation material 12. The surfacing material is applied by causing the sheet 12 to travel underneath the stream of material.

The foundation material for the roofing, such as roofing felt, is treated in the conventional manner, by passing the same through a preservative saturating material such as low melting asphalt. The sheet travels through pressing rollers which press out the surplus saturating compound and then between coating rollers which apply a substantial coating of mastic material such as heavy asphalt.

Uniformity in the flow of the stream of surfacing material is effected by the usual fluted feeding roll 13 placed below the open bottom of the hopper 10, and driven by means of shaft 14 to which a driving sprocket 15 is attached at one end. This shaft extends through and is journalled in the bearing brackets 16 which are attached to the hopper and support it upon the frame bars 17, said bracket bearings being bolted or otherwise secured to the frame bars. On the end of the shaft opposite the sprocket a bevelled toothed gear 18 is mounted for co-operating with a gear hereinafter described.

Suspended beneath the hopper is a reciprocating plate 19 supported by angle bars 20 which at one end are attached to the reciprocating plate by bolts 21 and at the other end carry rollers 22, these rollers being adapted to move transversely to the hopper and base material upon a track bar 23 that rests upon the side supporting bars of the frame. The reciprocating plate is inclined at an angle to the transverse plane of the hopper in order that the granular material from the hopper can gravitate over the plate upon the surface of the sheet material. This plate also is provided with ribs 24 attached to the upper surface, whereby the falling granular material is more positively intermixed as it falls from the hopper. These ribs if made separately can be secured upon the reciprocating plate in any well known manner such as welding, soldering, or the like. In the present instance, each rib is provided with a flange 25 welded to the distributing plate.

The conventional type of hopper, such as 10, is divided transversely into a plurality of compartments by means of partitions, each compartment being adapted to receive a different colored granular material. Obviously, a great variety of arrangement of colors as well as color values may be produced by suitable prearrangement of colors and proportioning of compartments. The individual batches of material are separately maintained in these respective compartments from whence they first flow in a continuous thin stream upon the distributing plate and then to the base sheet. As the materials flow out of the respective compartments towards the sheet, an irregular amount of mixing occurs which produces a correspondingly irregular effect when the mixed materials are delievered together upon the sheet. While there is a certain character of inter-mixing and blending between the materials if they flow from the various compartments without the use of the distributing plate, a greater variety in effect can be secured with the aid of this plate. In this instance, the reciprocating plate suspended between the hopper and sheet, is reciprocated by means comprising a wrist pin 26 eccentrically mounted upon disk 27 and driven by means of the stub shaft 28 journalled in the bearing bracket 29 that is secured to some part of the frame. Gear 30 on one end of the stub shaft intermeshes with the gear 18 on the end of the shaft 14, and rod 31 connects the wrist pin and reciprocating plate, there being a loose connection 32 between rod 31 and the plate in order to permit a universal moving of said rod in respect to the said plate.

In the operation of the embodiment the compartments of the hopper 10 are filled with differently colored material which is discharged in a continuous stream upon the base sheet 12. The reciprocating plate is suspended from the hopper between it and the base sheet and is inclined in such a manner that the falling material will flow over its ribbed face. The reciprocation of the mixing plate not only intermingles and blends the vari-colored particles into nonuniform mixtures which produce a variegated surface without defined or readily distinguishable areas of colors, but avoids any appreciable regularity either in blending size or arrangement of the differently colored patches.

While I have illustrated and described in detail the preferred embodiment of my invention, it should be clearly understood that the disclosure is merely for purposes of illustration and that many modifications and variations will naturally occur to those skilled in the art. Moreover it is not indispensable to employ all features of the invention conjointly since various features may be employed in other sub-combinations and combinations.

Having described one embodiment of my invention, I claim:

1. In a machine for making vari-colored roofing the combination comprising a delivery hopper adapted to deliver surfacing material to a sheet of roofing material, a reciprocating plate suspended from said hopper inclined at an angle to the surface of the roofing material and provided with spaced ribs, and an actuating means for said plate.

2. In a machine for making vari-colored roofing, a hopper, a plurality of compartments in said hopper, a reciprocating plate with guides thereon positioned below said hopper, said plate being arranged to reciprocate transversely of the roofing sheet whereby the material from each compartment in the hopper is mingled non-uniformly to produce a variegated surface without defined or readily distingushable areas of color.

3. In a machine for making vari-colored roofing the combination comprising a delivery hopper adapted to deliver differently colored supplies of surfacing material to a sheet of roofing material, a member bodily movable in a direction across the surface of the sheet for indiscriminately intermingling and depositing on the sheet the surfacing material into differently colored irregular areas of indefinite extent, and an actuating means for said movable member.

4. In a machine for making vari-colored roofing the combination comprising a delivery hopper adapted to deliver differently colored supplies of surfacing material to a sheet of roofing material, a member intermediate said roofing material and the hopper intercepting the delivery of the surfacing material, track means whereby the said member is capable of being actuated in a direction parallel to the sheet for causing inter-mingling and deposition on the sheet of the differently colored surfacing materials, and actuating means for the said member.

5. In a machine for making vari-colored roofing the combination comprising a delivery hopper adapted to deliver differently colored supplies of surfacing material to a moving sheet of roofing material, and means reciprocable in a direction transversely of the travel of the sheet for agitating, intermingling, and depositing the surfacing material on said roofing material.

6. In a machine for surfacing sheet roofing, means for supplying different kinds of surfacing material to a sheet of roofing, and means intermediate said supply means and the sheet of roofing upon which the different kinds of said material are delivered and movable laterally of said delivery whereby said materials are positively transported laterally of said delivery for causing varying intermingling of the different kinds of material and deposition thereof on the roofing sheet.

7. In a machine for applying surfacing material to a moving sheet of roofing, means for delivering a stream of non-uniform particles of surfacing material to the sheet, means movable transversely to the movement of the sheet and associated with said delivery of the means for inter-mingling transversely of the sheet and depositing thereon different portions of the surfacing material to modify the character of the surfacing material delivered to different portions of the sheet.

8. In a machine for surfacing a moving sheet of roofing with granular mineral material, a container having therein separate supplies of the granular mineral material, means for causing delivery of granular material from the different supplies in a direction toward the surface of the sheet, and means movable transversely to the motion of the sheet for conveying a portion of one of the materials as it is delivered from one supply and depositing it upon the sheet mixed with a portion of the material delivered from another supply.

9. In a machine for producing mixtone effects in roofing surfaced with contrasting granules, a hopper provided with compartments each containing a supply of granules contrasting with the granules in the adjacent compartment, said compartments being arranged successively transversely of a moving sheet of the roofing, means for discharging a continuous shower of the granules from said hopper so as to fall upon the moving sheet, and means interposed between the hopper and the moving sheet intercepting the falling granules reciprocable transversely of the motion of the sheet for moving the granules falling from one compartment into the shower of granules falling from another compartment and causing the combined granules to be delivered upon the sheet.

10. The method of making vari-colored roofing which comprises assembling a plurality of vari-colored surfacing materials within a delivery container, feeding the materials from the container in a continuous stream upon a sheet of roofing material and agitating the said materials to effect movement thereof laterally of the stream to produce varying mixture prior to contact with said roofing sheet.

11. The method of making vari-colored roofing which comprises assembling a plurality of vari-colored surfacing materials within a delivery container, feeding the materials from the container in a continuous stream upon a sheet of roofing material and agitating the said materials transversely of the stream to effect mixture of different portions of the stream during the flow upon said roofing sheet.

12. The method of producing cyclical mixtone effects in roofing surfaced with contrasting granules which comprises laterally intermixing the granules as they are supplied to a run of the roofing, and in cyclically varying proportions.

13. The method of applying surfacing material to sheet roofing which comprises delivering different kinds of surfacing material toward different areas of the sheet, and transporting a portion of one kind of the material as it is being delivered toward one area and mixing it with another kind of the material being delivered toward another area before application to the sheet.

14. The method of mixing different kinds of granular mineral material for surfacing a covering material which comprises causing the different kinds of granular material to fall toward different portions of the surface of the covering material, intercepting the fall of one of the different kinds of material, moving it across the surface to another portion thereof, and causing it to fall in the path of another kind of material falling on said other portion of the surface.

15. The method of mixing different kinds of granular mineral material for surfacing a covering material which comprises causing the different kinds of material to fall toward different portions of the surface of the covering material, intercepting the fall of one of the different kinds of material, moving it across the surface to another portion thereof, and causing it to fall in the path of another kind of material falling toward said other portion of the surface, said material being intercepted in increasing and then in decreasing amount.

16. The method of producing multicolor roofing surfaced with mineral granules which comprises supplying to the surface of the roofing at least two colors of granules in separate streams and so moving laterally of the streams varying amounts of the two colors as to varyingly intermingle them in a cycle.

17. The method of producing multicolor roofing surfaced with mineral granules which comprises supplying to the surface of the roofing at least two colors of granules in separate streams, intercepting varying amounts of the two colors so that as less of one color is intercepted more of the other color is intercepted, moving the intercepted colors laterally of the streams, and mixing the first color with the other color.

18. The method of producing multicolor roofing surfaced with mineral granules which comprises supplying to the surface of the roofing at least two colors of granules in separate streams, and so intercepting and moving laterally of the streams varying amounts of the two colors that in a cycle less and then more of one color is intercepted and is mixed with more and then less of another color.

19. The method of mixing different kinds of granular mineral material for surfacing a covering material which comprises moving from adjacently arranged sources the different kinds of material toward the surface of the covering material and so deflecting the motion of portions of the different kinds of granular material as to cause said portions to move in the line of motion of other portions of the different granular materials.

20. The method of mixing different kinds of granular mineral material for surfacing a covering material which comprises moving toward the surface of the covering material the different kinds of granular material in a composite stream, arresting the motion of a portion of said stream at one place in its travel, moving the arrested portion of the stream transversely of the motion of the granular material toward the covering material, and releasing said portion in the path of motion toward the covering material of a different portion of the stream.

21. The method of mixing different kinds of granular mineral material for surfacing a covering material which comprises causing the different kinds of granular material to fall toward different portions of the surface of the covering material, intercepting the fall of the different granular materials so that they are temporarily subjected to accumulation, and releasing said accumulation in a different zone of the falling material to mix therewith.

22. The method of mixing different kinds of granular mineral material for surfacing a covering material which comprises causing the different kinds of granular material to fall toward different portions of the surface of the covering material, intercepting the fall of the different granular materials so as to be temporarily subjected to accumulation, moving said intercepted accumulation across the surface of the covering material while subjecting it to further accretion of different falling granular material to mix therewith, and releasing the mixture to fall upon the covering material.

23. The method of mixing different kinds of granular mineral material for surfacing a covering material which comprises causing the different kinds of granular material to fall toward different portions of the surface of the covering material, intercepting the fall of the granular material so as to temporarily accumulate the granules thereof while moving said accumulation into the line of fall of different granular material to mix therewith, and simultaneously releasing the previously intercepted and the admixed granules.

24. The method of producing a varied surfacing effect in sheet coverings surfaced with mineral granules which comprises delivering the granules toward the surface of the sheet from separate supplies of different kinds of the granules, conveying a portion of one of the kinds of granules as it is delivered from one supply and depositing it upon the sheet mixed with a portion of another kind of the granules.

25. The method of mixing different kinds of granular mineral material for surfacing a covering material which comprises causing the different kinds of granular material to flow continuously in adjacent streams, and varyingly intermingling the streams without interrupting the flow thereof by varyingly moving portions of said streams laterally of the flow thereof into the flow of other streams.

26. Apparatus of the character described comprising supply sources for contrasting roofing surface granules, means for receiving the granules flowing from said sources, and means acting laterally of the flow of the granules for combining the granules in their flow from said sources to the roofing sheet in cyclically varying proportions.

27. Apparatus for coating roofing strips comprising means for advancing the roofing strip, a plurality of sources of supply of differently colored minerals, means for withdrawing streams of said minerals, and means acting laterally of said streams for intermixing the minerals of said streams in cyclically varying quantities and applying the intermixing minerals to the advancing strip.

28. In an apparatus for applying surfacing material to sheet roofing, means for delivering different kinds of surfacing material toward different areas of the sheet, and means for transporting a portion of one kind of the material as it is being delivered toward one area and mixing it with another kind of the material being delivered toward another area before application to the sheet.

29. Apparatus for applying surfacing materials to a sheet of roofing which comprises means for delivering different kinds of surfacing material toward the sheet of roofing in separate paths of flow, and means for moving laterally of the movement of the materials toward the sheet a portion of one of said materials as it moves toward the sheet and mixing it with another of the materials as it moves toward said sheet.

In testimony whereof I affix my signature.

EDWARD C. OTIS.